W. V. TURNER.
SPEED CONTROLLED BRAKE DEVICE.
APPLICATION FILED MAR. 30, 1915.

1,255,957.

Patented Feb. 12, 1918.
2 SHEETS—SHEET 1.

WITNESSES

INVENTOR
Walter V. Turner
by Edward H. Wright
Atty.

W. V. TURNER.
SPEED CONTROLLED BRAKE DEVICE.
APPLICATION FILED MAR. 30, 1915.

Patented Feb. 12, 1918.

UNITED STATES PATENT OFFICE.

WALTER V. TURNER, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

SPEED-CONTROLLED BRAKE DEVICE.

1,255,957.  Specification of Letters Patent.  Patented Feb. 12, 1918.

Application filed March 30, 1915. Serial No. 18,039.

*To all whom it may concern:*

Be it known that I, WALTER V. TURNER, a citizen of the United States, residing at the borough of Edgewood, in the county of Allegheny and State of Pennsylvania, have invented a certain new and useful Improvement in Speed-Controlled Brake Devices, of which improvement the following is a specification.

This invention relates to that type of fluid pressure brake apparatus which is governed by the speed of the vehicle, the object being to provide an improved speed controlled valve means for supplying fluid from the main or other reservoir, or independent source, to the brake cylinder when the speed exceeds a predetermined maximum rate, and to automatically release the fluid from the brake cylinder when the speed has been reduced, to or below a certain rate. This improvement is preferably employed in connection with the usual automatic air brake system, and a double check valve device is used for the purpose of closing the escape from the brake cylinder through the exhaust port of the automatic valve or through the exhaust port of the speed controlled valve means, when the application of the brakes is being made by either the one or the other of said valves.

Figure 1:
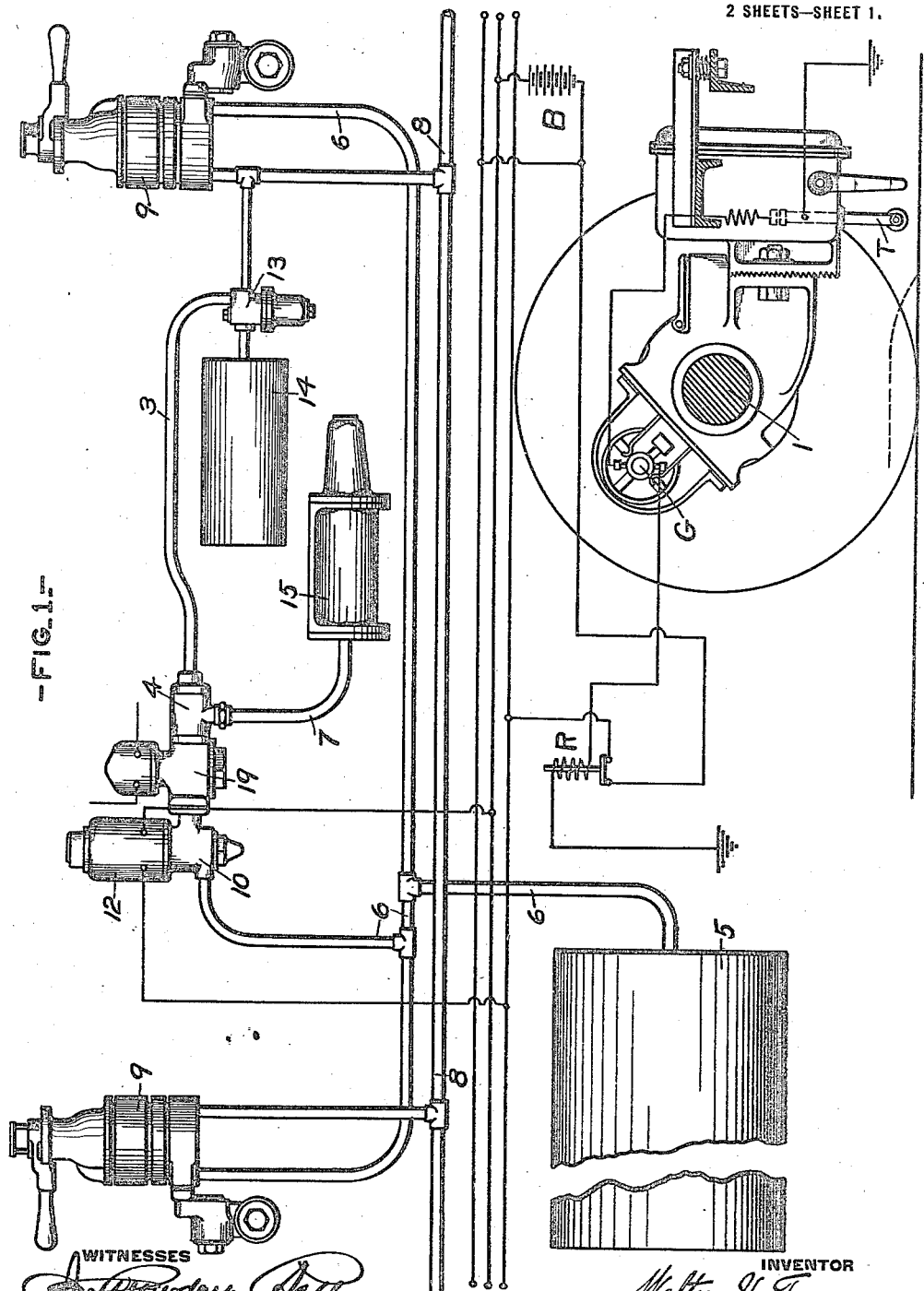

In the accompanying drawings: Figure 1 is a diagram illustrating a speed controlled brake equipment as applied to a double ended car, and embodying my improvement; and Fig. 2, a section showing the improved valve means in detail.

As shown in Fig. 1, the vehicle may be equipped with the usual standard automatic air brake system comprising a main reservoir, 5, train brake pipe, 8, triple valve, 13, auxiliary reservoir, 14, brake cylinder, 15, and brake valves, 9, at either end of the car, connected to main reservoir pipe, 6, and to the brake pipe, 8. The speed controlled valve means, 10, is connected to main reservoir pipe, 6, and is adapted to supply air therefrom to the double check valve device, 4, and through pipe, 7, to the brake cylinder. This supply of air also operates the circuit breaker, 19, to open the electric circuit. The triple valve, 13, is connected by pipe, 3, with the double check valve. An electro-magnet, 12, the circuit to which is governed by a speed controlled mechanism, may be employed to operate the valve means, 10.

Figure 2:
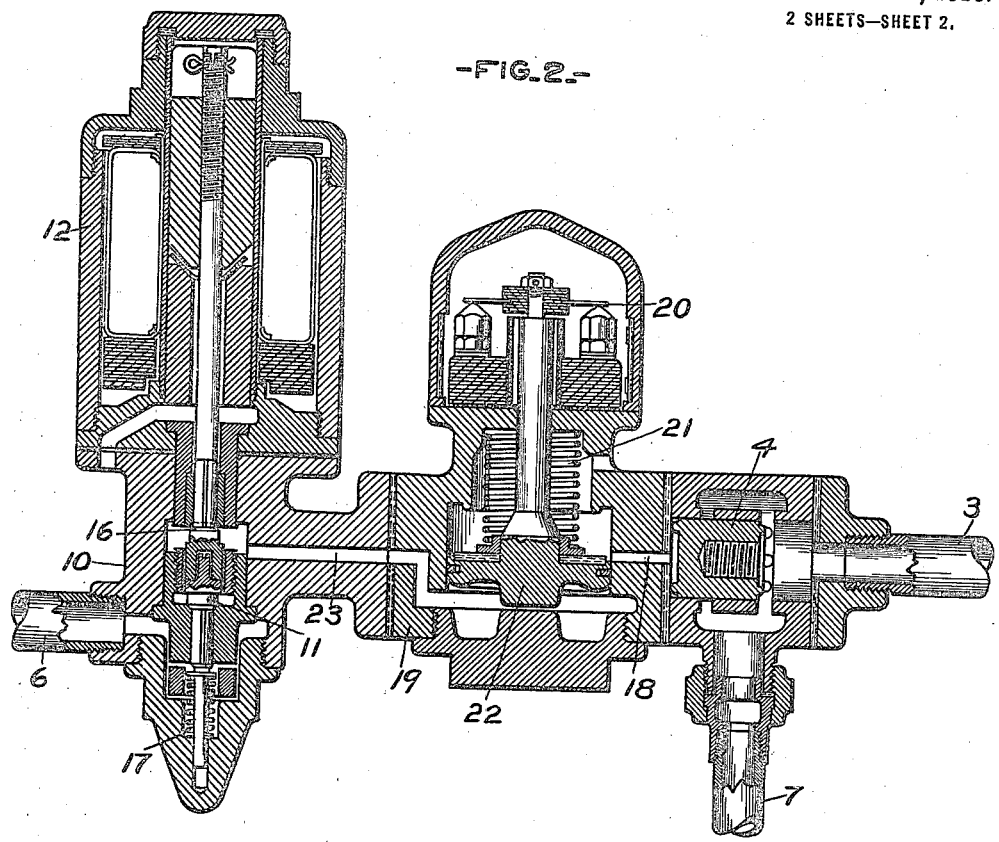

As shown more fully in Fig. 2, this valve means comprises a supply valve, 11, and an exhaust valve, 16, both actuated by the core of the electro-magnet, 12, and a spring, 17. The port, 23, leads to the cylinder, 19, containing piston, 22, attached to the switch, 20, for controlling a supply circuit to the motors, and port, 18, communicates with the chamber of the double check valve, 4. This port, 18, preferably leads from the upper portion of the cylinder in order to insure the movement of the piston, 22, before communication from the supply is open to the brake cylinder.

Any suitable form of speed controlled mechanism may be employed, that indicated in Fig. 1, comprising a generator, G, driven by the axle, 1, and connected in circuit with relay switch, R, normally closed and controlling a circuit from the battery, B, to the magnet, 12. The valve, 11, is normally held closed by the energized magnet, 12, against the fluid pressure acting beneath said valve, and the spring, 17. The switch, 20, is normally held closed by spring, 21, acting on piston, 22.

With the parts in their normal positions and the system charged with air under pressure in the usual manner, the automatic brake system may be operated in the ordinary way, to apply and release the brakes whenever desired, during which operation the double check valve, 4, remains seated against the port, 18. When the circuit to the electro-magnet, 12, is opened by the speed controlled relay switch, R, the magnet is deënergized, thus allowing the supply valve, 11, to open and the exhaust valve, 16, to close by the action of the fluid pressure and the spring, 17. Air from the main reservoir pipe, 6, then flows through port, 23, to the piston, 22, raising the same to open the switch, 20, and then passing through port, 18, and pipe, 7, to the brake cylinder to apply the brakes. The double check valve now remains seated against the pipe, 3, to prevent escape of air through the exhaust of the triple valve. When the speed is reduced to the desired rate, the relay switch, R, is again closed, and the magnet, 12, is then energized to close the valve, 11, and open the valve, 16, whereby the air from the brake cylinder is released to the atmosphere. As the pressure acting on the piston, 22, diminishes, the spring, 21, operates to move the piston downward and close the switch, 20, and the power circuit. If the circuit of the axle driven generator is to be made effective at certain zones along the track, trip devices, T, may be provided for engaging certain ramps located at the respective zones, whereby the circuit may be closed with the proper amount of resistance for the desired maximum speed permissible at each particular zone.

Having now described my invention, what I claim as new and desire to secure by Letters Patent is:

1. In a fluid pressure brake apparatus, the combination with an automatic train pipe and valve device operated by variations in train pipe pressure for controlling a supply of fluid to and its release from the brake cylinder, of a reservoir, a valve also controlling a supply of fluid from said reservoir to the brake cylinder, and its release from the brake cylinder, an electro-magnet for operating said valve, a speed controlled mechanism for governing the current to said magnet, and a double check valve for closing communication from one source when fluid is being supplied from the other.

2. In a fluid pressure brake apparatus, the combination with an automatic train pipe and valve device operated by variations in train pipe pressure for controlling a supply of fluid to and its release from the brake cylinder, of a reservoir, a valve means also controlling a supply of fluid from said reservoir to the brake cylinder, a device operated by the fluid from said valve means for cutting off the supply of current to the motors, and a speed controlled mechanism for governing the operation of said valve means.

WALTER V. TURNER.

Witnesses:
A. M. CLEMENTS,
S. W. KEEFER.